US012086180B2

(12) United States Patent
Corrion et al.

(10) Patent No.: US 12,086,180 B2
(45) Date of Patent: Sep. 10, 2024

(54) RAPID VIDEO SEARCH SYSTEM AND METHOD OF USING THE SAME

(71) Applicant: Dice Corporation, Bay City, MI (US)

(72) Inventors: Gerald Corrion, Bay City, MI (US); Clifford Dice, Bay City, MI (US); Kevin Kilborn, Bay City, MI (US); Abdulrahman Zaiter, Bay City, MI (US)

(73) Assignee: Dice Corporation, Bay City, MI (US)

( * ) Notice: Subject to any disclaimer, the term of this patent is extended or adjusted under 35 U.S.C. 154(b) by 23 days.

(21) Appl. No.: 17/466,491

(22) Filed: Sep. 3, 2021

(65) Prior Publication Data

US 2021/0397650 A1 Dec. 23, 2021

Related U.S. Application Data

(63) Continuation of application No. 16/711,551, filed on Dec. 12, 2019, now Pat. No. 11,138,264.

(51) Int. Cl.
*G06F 16/73* (2019.01)
*G06F 3/0482* (2013.01)
*G06F 16/738* (2019.01)
*G06F 16/74* (2019.01)
*G11B 27/10* (2006.01)
*H04N 5/77* (2006.01)

(52) U.S. Cl.
CPC .......... *G06F 16/739* (2019.01); *G06F 3/0482* (2013.01); *G06F 16/743* (2019.01); *G11B 27/102* (2013.01); *H04N 5/77* (2013.01)

(58) Field of Classification Search
CPC .... G06F 16/739; G06F 16/743; G06F 3/0482; G11B 27/102; H04N 5/77
See application file for complete search history.

(56) References Cited

U.S. PATENT DOCUMENTS

| | | | |
|---|---|---|---|
| 8,635,531 B2 | 1/2014 | Graham et al. | |
| 9,311,405 B2 | 4/2016 | Yuen | |
| 11,610,607 B1* | 3/2023 | Huang | G06V 10/761 |
| 2008/0104521 A1* | 5/2008 | Dubinko | G06F 3/0484 |
| | | | 715/744 |
| 2022/0101630 A1* | 3/2022 | Arrison | G06F 16/743 |

\* cited by examiner

*Primary Examiner* — Mishawn N. Hunter
(74) *Attorney, Agent, or Firm* — Brooks Kushman PC

(57) ABSTRACT

A method for searching a digital video recording is disclosed. The method includes receiving a video portion count associated with the digital video recording. The method further includes displaying in a graphical user interface (GUI) a number of sequential digital video images from the digital video recording in response to the video portion count to obtain displayed digital video images. The number of sequential digital video images is associated with a number of sequential portions of the digital video recording.

19 Claims, 2 Drawing Sheets

RAPID VIDEO SEARCH SYSTEM AND METHOD OF USING THE SAME

CROSS-REFERENCE TO RELATED APPLICATIONS

This application is a continuation of U.S. application Ser. No. 16/711,551 filed Dec. 12, 2019, and issued as U.S. Pat. No. 11,138,264 on Oct. 5, 2021, the disclosure of which is hereby incorporated in its entirety by reference herein.

TECHNICAL FIELD

The field to which the disclosure generally relates includes video management systems that may include a searchable video recordings and methods of searching recorded video.

BACKGROUND

Video management systems and servers may be deployed in video surveillance systems. Video management systems collect video from cameras and other sources, record and store said video to storage devices, and may provide a graphical user interface (GUI) to view video live or access, search, and review recorded video.

A video management system or video surveillance system may include a plurality of cameras or other sources of video which may capture and record video segments to a storage device, such as, but not limited to a hard drive. Video management systems commonly store data such as recorded video in file systems which manage data such as a file hierarchy. A video management system may also provide an interface such as a GUI which allows and facilitates a user searching and reviewing previously recorded segments of video on a computer device. A user may select a desired time frame from which previously recorded video may be reviewed, and the computer device will load and display the selected segment of video to the user by loading the selected segment of video from the storage device. After which, the user may then manually search the segment of video for any desired portion or event via scrolling through the segment of video. Manual user search of a segment of video may be time consuming and may require tedious scrolling through long durations of video, often videos twenty-four hours in length, in order to find an event or occurrence that may have taken place in only a matter of seconds. Large segments of video recorded in a traditional file hierarchy require long load times and high bandwidth usage if being searched from local, remote, or cloud storage.

SUMMARY OF ILLUSTRATIVE VARIATIONS

A computer system for video management may enable repeating the steps of user thumbnail selection, representative subdivision of a recorded video to be viewed based on the thumbnail selected, and display of representative thumbnails in a GUI.

A computer system for video management may provide a GUI that may enable repeating the steps of user thumbnail selection, representative subdivision of a recorded video to be viewed based on the thumbnail selected, and display of representative thumbnails in a GUI. The representative thumbnails may be selected based on a parameter such as random selection or images that may be evenly distributed from within the recorded video. After the representative subdivision of a recorded video to be viewed reaches a lower limit, the computer system for video management may display a shortened portion of video in the GUI to be viewed.

A computer system for video management may record video and sequential images from a device such as a camera. The computer system for video management may provide a GUI in a user accessible internet browser. The GUI may be constructed and arranged to display particular images as user clickable or selectable thumbnails which may be hyperlinks. The GUI may be constructed and arranged to allow user input of a duration of recorded video to be rapidly searched and a number of thumbnails to be displayed in the GUI. The computer system for video management may receive the user input and search a data storage medium or storage environment such as an object store for stored video and images. The computer system for video management may divide the user input number of thumbnails to be displayed in the GUI into a first duration of recorded video to be rapidly searched to determine which images may be displayed as representative thumbnails in the GUI. The computer system for video management may select and display selectable thumbnails which are chronologically evenly distributed throughout the first duration of video to be rapidly searched. Each thumbnail may correspond to a duration of video equal to the length of the original video being searched divided by the number of thumbnails to be displayed. Upon user selection of a particular thumbnail, the computer system for video management may divide the user input number of thumbnails to be displayed in the GUI into a second duration of recorded video associated with the selected thumbnail to determine which images may be displayed as a second set representative thumbnails in the GUI of only the second duration of recorded video. A user may select one of the thumbnails in the second set of representative thumbnails and the computer system for video management may divide the user input number of thumbnails to be displayed in the GUI into a third duration of recorded video associated with the selected thumbnail to determine which images may be displayed as a third set representative thumbnails in the GUI of only the third duration of recorded video. These steps may be repeated until a predetermined lower limit or shortest duration of recorded video is reached after which the computer system for video management may load from the storage environment the shortest duration of record video and display it in the GUI for a user to view as video.

As a non-limiting example, a user wishing to review 24 hours of video and view 6 thumbnails in the GUI may enter such values in the GUI, and the system may display 6 images as thumbnails, the images being pulled from approximately 0 seconds, 14,400 seconds, 28,800 seconds, 43,200 seconds, 57,600 seconds, and 72,000 seconds into the duration of the 24 hours of video. Each thumbnail may correspond to a duration of video equal to the length of the original video being searched divided by the plurality of thumbnails to be displayed. In this example, each of the six thumbnails would initially correspond to six distinct 4-hour portions of the original 24 hours of video. In this way, the total duration of video is visually divided into a plurality of distinct thumbnails, each thumbnail associated with a different portion of the total duration of video, without actually loading, downloading, or dividing the duration of recorded video.

The images may be displayed as selectable thumbnails which, once selected, repeat the process of pulling images from within evenly spaced, periodic intervals of the portion of video associated with the selected thumbnail and displaying them as additional selectable thumbnails in the GUI. Continuing from the example above, if a user selects the thumbnail associated with seconds 14,401 to 28,800 seconds, (roughly the time period from 4 to 8 hours within the original 24 hour video), the subsequently displayed thumbnails in the GUI will be pulled only from within the 14,401 to 28,800 second time period. This process may continue, shortening the duration of video being displayed as thumbnails, until the duration of video being reviewed reaches, for example, about ten minutes or more or less, after which the video may be downloaded and displayed to the user in the GUI as a viewable video.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
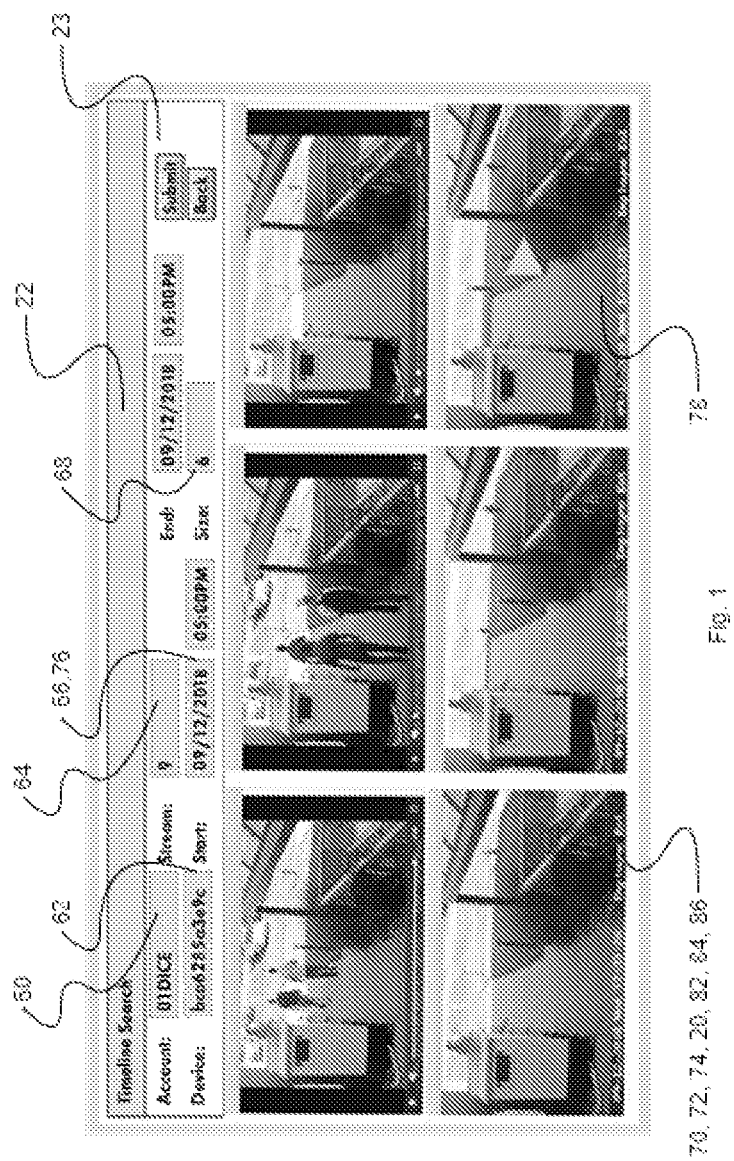
FIG. 1 depicts a graphical user interface for viewing, searching, and selecting segments of video on a video search system according to one variation.

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

A method may include providing a computer having non-transitory memory for storing machine instructions that may be executed by the computer, the machine instructions optionally implementing the following tasks when executed by the computer: recording a first duration of video and a first plurality of images from a camera, the first plurality of images associated chronologically with the first duration of video; storing the first duration of video in a data storage medium while simultaneously storing the plurality of images in the data storage medium; providing a GUI constructed and arranged to display a first plurality of thumbnails and being constructed and arranged to receive a user input of a first value for the first duration of video to be viewed and searched and user input of a second value for the first plurality of thumbnails to be displayed in the GUI; receiving the first value and the second value; searching the data storage medium for a second plurality of images equal in number to that of the second value; selecting each of the individual images in the second plurality of images by selecting images that may be chronologically and evenly distributed throughout the duration of the first duration of video; and displaying each image in the second plurality of images as individual thumbnails in the first plurality of thumbnails in the GUI wherein each of the individual thumbnails in the first plurality of thumbnails may be a selectable hyperlink.

A method may include providing a GUI constructed and arranged to display a first plurality of thumbnails and being constructed and arranged to receive a user input of a first value for a first duration of video to be viewed and searched and user input of a second value for the first plurality of thumbnails to be displayed in the GUI; receiving the first value and the second value; searching an object store for a second plurality of images equal in number to that of the second value; selecting each of the individual images in the second plurality of images by selecting images that may be chronologically and evenly distributed throughout the duration of the first duration of video; displaying each image in the second plurality of images as individual thumbnails in the first plurality of thumbnails in the GUI wherein each of the individual thumbnails in the first plurality of thumbnails may be a selectable hyperlink; receiving user input in the form of selecting a thumbnail; repeating the tasks of receiving, searching, selecting, and displaying until the duration of a video segment reaches a predetermined lower limit; and displaying the video segment in the GUI as viewable video.

A method may include recording a first duration of video and a first plurality of images from a camera, the first plurality of images associated chronologically with the first duration of video; storing the first duration of video in an object store while simultaneously storing the plurality of images in the object store; providing a GUI constructed and arranged to display a first plurality of thumbnails and being constructed and arranged to receive a user input of a first value for the first duration of video to be viewed and searched and user input of a second value for the first plurality of thumbnails to be displayed in the GUI; receiving the first value and the second value; searching the object store for a second plurality of images equal in number to that of the second value; selecting each of the individual images in the second plurality of images by selecting images that are chronologically and evenly distributed throughout the duration of the first duration of video; displaying each image in the second plurality of images as individual thumbnails in the first plurality of thumbnails in the GUI wherein each of the individual thumbnails in the first plurality of thumbnails may be a selectable hyperlink; receiving user input in the form of selecting a thumbnail; repeating the tasks of receiving, searching, selecting, and displaying until the duration of a video segment reaches a predetermined lower limit; and displaying the video segment in the GUI as viewable video.

Figure 2:
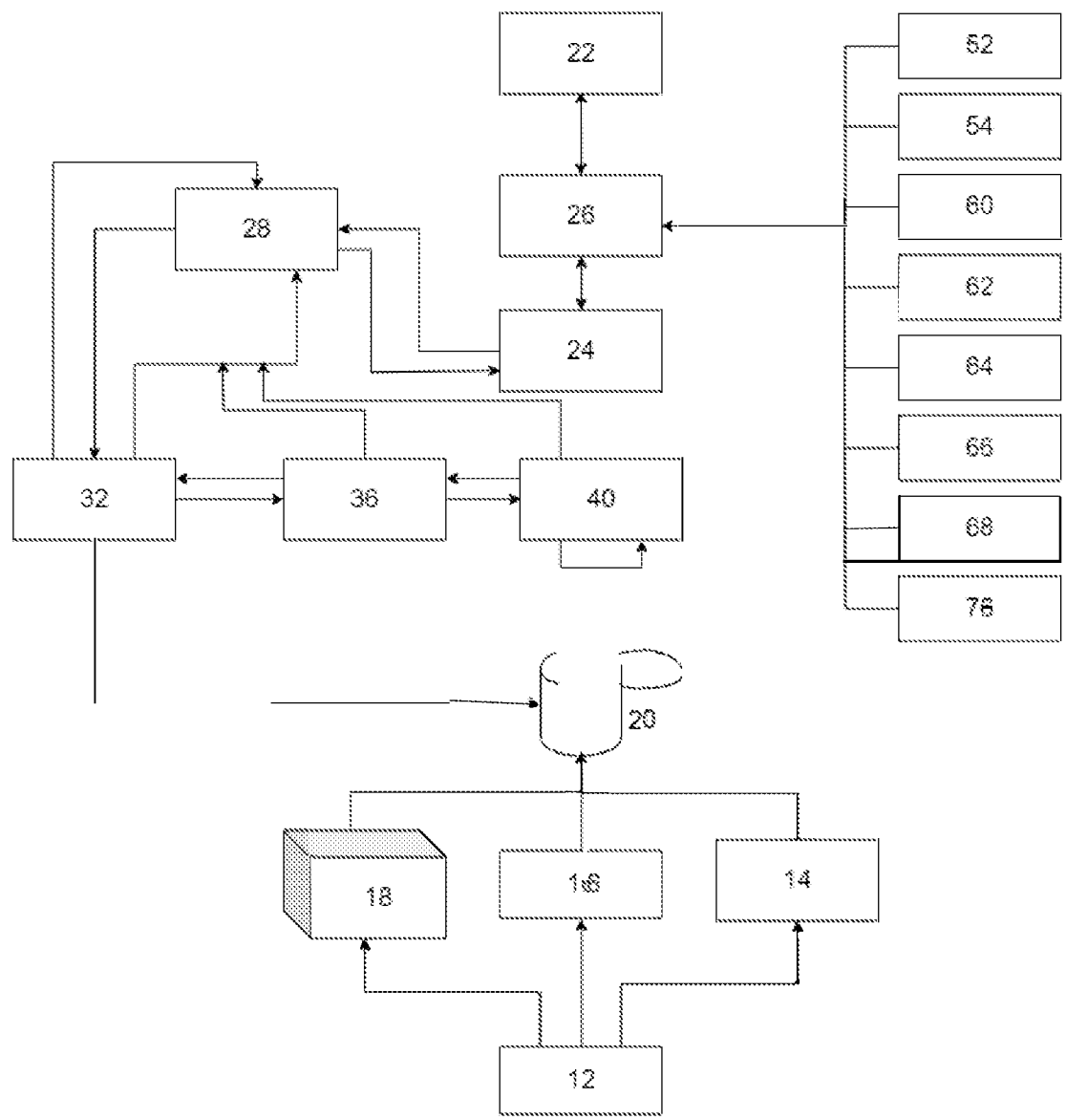
FIG. 2 depicts a flow chart of an application communication protocol according to one variation.

Referring to FIGS. 1 and 2; a web browser 22 may be accessible by a user. A graphical user interface 26 may be provided by the web application programming interface 24 in the browser 22. The GUI 26 may be constructed and arranged to receive user input values such as account number 60; video recording device 62; stream identification 64; start and end times of recorded video to be searched 66 or alternatively an input for a duration of recorded video to be viewed; calendar dates of recorded video to be viewed 76; and number or count of thumbnails to be viewed in the GUI 68. The named user input values are demonstrative only and additional user inputs may be contemplated and are considered to be within the scope of the invention. The GUI may display a first plurality of user selectable thumbnails 70; a second plurality of user selectable thumbnails 72; a third plurality of user selectable thumbnails 74; and so on with each subsequent selection of an individual thumbnail. The GUI may display a viewable video 78. Each individual thumbnail in any of the plurality of thumbnails may display a representative image 80, 82, 84 and each individual thumbnail in any of the plurality of thumbnails may correspond to a portion of the recorded video to be viewed. That is, a first image/thumbnail may be representative of a first portion of the record video to be viewed, and a second image/thumbnail may be representative of a chronologically second portion of the record video to be viewed, and a third image/thumbnail may be representative of a chronologically third portion of the record video to be viewed, and so on wherein the entire duration of the recorded video to be viewed is spread across the portions of recorded to be viewed and which are represented by their respective image/thumbnail. A user may select a first thumbnail representing a first portion of the recorded video to be viewed from the first plurality of user selectable thumbnails 70, 72, 74 after which the web application programming interface 24 may display a subsequent plurality of user selectable thumbnails 70, 72, 74 representing a plurality of portions of the first portion. A user may continue to select thumbnails until the duration of the portions of video being searched reaches a lower limit, after which the web application programming interface 24 may display viewable video 78.

Referring to FIGS. 1 and 2; a computer system for video management 10 may periodically record via a recorder container 12 at least one first video file 14, at least one first image 16 associated with the at least one first video file 14, and a plurality of images 18 associated with the at least one first video file 18 to an object store 20. The computer system for video management 10 may provide a graphical user interface (GUI) 26 via a browser 22 to a user. The GUI may be constructed and arranged to receive as an input 60, 62, 64, 66, 68: a user determined duration of recorded video 54 to be viewed and a user determined count of video portions 52 into which the duration of recorded video will be representatively split and displayed as plurality of thumbnails. A web application programming interface 24 may receive from the browser 22 the duration of recorded video 54 to be viewed and the user determined count of video portions 52 to be displayed in the GUI 26. The web application programming interface 24 may display a number of thumbnails equal to the user determined count in the GUI, each of the thumbnails being determined by the web application programming interface 24 as representative of a shortened portion of the duration of recorded video 54 to be viewed e.g., the first recorded image of the shortened portion of the duration of the recorded video 54. That is, the web application programming interface 24 may display as thumbnails the first image 16 which corresponds to a shortened portion of recorded video to be viewed. Images may be identified by a unique timestamp 28 which may be determined by the web application programming interface 24. Each video segment and image may be saved within an object store 20 according to a name in the form of a unique alphanumeric identifier that may be made up of four unique elements identifying the MAC address of the camera from which the video segment or image was captured; the stream ID; an identifier establishing whether the saved object is a video segment or an image; and a unique timestamp. The four unique elements of the unique identifier may be a string of alphanumeric characters. As a non-limiting example, the unique identifier may be a sixteen-digit numeric identifier wherein each of the four unique elements are identified by four characters. The MAC address may be a globally unique identifier of a physical piece of hardware, such as a camera. The stream ID may be, for example, any output from a physical piece of hardware such as a camera, digital video recorder, network video recorder, web stream, or any digital signal that may or may not be dewarped into a plurality of viewing angles i.e., in the case where a camera may include a fish-eye style lens or three-hundred sixty capture. Alternatively, the stream ID may be or may include incrementally assigned numbers or a randomized unique number. The identifier may establish whether the saved object is a video segment or an image. The unique timestamp may be a numerical value calculated from a Unix timestamp relative to the duration of the video being stored e.g., in a ten-minute portion of recorded video, the time stamp may be the Unix time stamp divided by the duration of the ten minute portion in seconds and rounded up or down. As an example, when recording from a continuous stream, the system may be delineating ten-minute "portions" of video at 0 seconds to 36000 seconds, 36001 second to 72000 seconds, and so on. Similarly, an image at 32000 seconds may have a unique timestamp calculated from a Unix timestamp relative to the 32000 second position of the image.

A table may calculate and simplify the above exemplary sixteen-digit alphanumeric identifier into an alphanumeric identifier having fewer characters to further expedite the searching of recorded video and images.

The web application programming interface 24 may list, identify, or store images or portions of recorded video by their unique timestamp 28, which may include listing, identifying, or storing images 28 according to a shortened portion of recorded video to which they correspond. The web application programming interface 24 may determine which images to be displayed in the GUI 26 by searching the object store 20 for the images having unique identifiers which correspond to being the first image 16 in a particular segment of video based upon value of the unique identifier 32, or a combination of any of the four unique elements that may make up the unique numeric identifier 32. In the event that the web application programming interface cannot locate the desired image or portion of recorded video, the web application programming interface may perform a search for approximate matches 36, predecessor, successor, or "nearest neighbors" by increasing or decreasing the value of the unique alphanumeric identifier to locate an appropriate image of portion of recorded video. If the web application programming interface again cannot locate the desired image or portion of recorded video, the web application programming interface may strike the last value of the unique alphanumeric identifier 40 and perform the search again. Once the appropriate image has been found, it may be output and displayed as thumbnails which may be selectable URL links.

After the web application programming interface 24 has determined which images to be displayed in the GUI, it may provide said images as clickable thumbnails that each function as an in-browser hyperlink that may instruct the web application programming interface 24 to once again display a number of thumbnails equal to the user determined count in the GUI, each of the thumbnails being determined by the web application programming interface 24 as representative of a shortened portion of a duration of recorded video 54 to be viewed e.g. the first recorded image of the shortened portion of the duration of the recorded video 54. That is, the web application programming interface 24 may display as thumbnails the first recorded image which corresponds to a shortened portion of recorded video to be viewed. This process of user thumbnail selection, representative subdivision of the recorded video to be viewed, and display of representative thumbnails in the GUI may be repeated until the duration of recorded video to be viewed reaches a predetermined minimum duration at which point a final portion of the duration of recorded video to be viewed may displayed as a viewable video in the browser. The final portion of the duration of recorded video to be viewed may be displayed in the GUI as viewable video 78 when the web application programming interface 24 determines that the predetermined minimum duration has been reached.

For non-limiting exemplary purposes, images may be selected and downloaded from the object store according to an alphanumeric identifier. The images searched, selected, and downloaded may include timestamps associated with periodic intervals within the duration of video. As a non-limiting example, a user wishing to review 48 hours of video and view 6 thumbnails in the GUI may enter such values in the GUI, and the system may display 6 images as thumbnails, the images being pulled from approximately 0 seconds, 28,800 seconds, 57,600 seconds, 86,400 seconds, 115,200 seconds, and 144,000 seconds into the duration of the 48 hours of video. Each thumbnail may correspond to a duration of video equal to the length of the original video being searched divided by the plurality of thumbnails to be displayed. In this example, each of the six thumbnails would initially correspond to six distinct 8-hour portions of the original 48 hours of video. In this way, the total duration of video is visually divided into a plurality of distinct thumbnails, each thumbnail associated with a different portion of the total duration of video, without actually loading, downloading, or dividing the duration of recorded video.

The images may be displayed as selectable thumbnails which, once selected, repeat the process of pulling images from within evenly spaced, periodic intervals of the portion of video associated with the selected thumbnail and displaying them as additional selectable thumbnails in the GUI. Continuing from the example above, if a user selects the thumbnail associated with seconds 28,801 to 57,600 seconds (roughly the time period from 8 to 16 hours within the original 48 hour video) the subsequently displayed thumbnails in the GUI will be pulled only from within the 28,801 to 57,600 second time period. This process may continue, representatively shortening the duration of video being displayed as thumbnails, until the duration of video being reviewed reaches, for example, about ten minutes or more or less, after which the video may be downloaded and displayed to the user in the GUI as a viewable video.

The computer system for video management may include instructions that may be ran, for example, in a pod in a Kubernetes cluster, on a virtual machine, or on local hardware or "bare metal" hardware such a laptop or personal computer. These non-limiting environments in which the computer system for video management that may include instructions are provided for exemplary purposes only and the scope of the invention anticipates alternate suitable environments.

According to a variation 1, a method may include providing a computer having non-transitory memory for storing machine instructions that may be executed by the computer, the machine instructions optionally implementing the following tasks when executed by the computer: recording a first duration of video and a first plurality of images from a camera, the first plurality of images associated chronologically with the first duration of video; storing the first duration of video in a data storage medium while simultaneously storing the plurality of images in the data storage medium; providing a GUI constructed and arranged to display a first plurality of thumbnails and being constructed and arranged to receive a user input of a first value for the first duration of video to be viewed and searched and user input of a second value for the first plurality of thumbnails to be displayed in the GUI; receiving the first value and the second value; searching the data storage medium for a second plurality of images equal in number to that of the second value; selecting each of the individual images in the second plurality of images by selecting images that may be chronologically and evenly distributed throughout the duration of the first duration of video; and displaying each image in the second plurality of images as individual thumbnails in the first plurality of thumbnails in the GUI wherein each of the individual thumbnails in the first plurality of thumbnails may be a selectable hyperlink.

Variation 2 may include a method as set forth in variation 1 and may further include the steps of: receiving user input in the form of selecting a thumbnail; searching the data storage medium for a third plurality of images equal in number to that of the second value; selecting each of the individual images in the third plurality of images by identifying images that may be chronologically evenly distributed throughout the duration of a second duration of video, the second duration of video being the duration of video corresponding to the duration between the image associated with user selected thumbnail and a subsequent image; and displaying each image in the third plurality of images as individual thumbnails in a second plurality of thumbnails in the GUI wherein each of the individual thumbnails in the second plurality of thumbnails may be a selectable hyperlink.

Variation 3 may include a method as set forth in any of variations 1-2 and may further include the steps of repeating the tasks of receiving, searching, selecting, and displaying until the duration of a video segment reaches a predetermined lower limit; and displaying the video segment in the GUI as viewable video.

Variation 4 may include a method as set forth in any of variations 1-3 wherein the predetermined lower limit may be about ten minutes.

Variation 5 may include a method as set forth in any of variations 1-4 wherein individual images and video segments may include a unique identifier that may include a MAC address of a camera from which the video segment or image was captured, a stream ID, an identifier establishing whether the saved object may be a video segment or an image, and a unique timestamp.

Variation 6 may include a method as set forth in any of variations 1-5 wherein searching the data storage medium for a second plurality of images equal in number to that of the second value may further include determining that individual images in the second plurality of images cannot be found; and performing a search for approximate matches of the individual images in the second plurality of images.

Variation 7 may include a method as set forth in any of variations 1-6 wherein searching the data storage medium for a second plurality of images equal in number to that of the second value may further include determining that individual images in the second plurality of images cannot be found; performing a search for approximate matches of the individual images in the second plurality of images; determining that individual images in the second plurality of images cannot be found; removing the last digit in the unique identifier; and performing a search for approximate matches of the individual images in the second plurality of images.

Variation 8 may include a method as set forth in any of variations 1-7 may further include calculating and simplifying the unique identifier into a second unique identifier having fewer characters.

According to a variation 9, a method may include providing a GUI constructed and arranged to display a first plurality of thumbnails and being constructed and arranged to receive a user input of a first value for a first duration of video to be viewed and searched and user input of a second value for the first plurality of thumbnails to be displayed in the GUI; receiving the first value and the second value; searching an object store for a second plurality of images equal in number to that of the second value; selecting each of the individual images in the second plurality of images by selecting images that may be chronologically and evenly distributed throughout the duration of the first duration of video; displaying each image in the second plurality of images as individual thumbnails in the first plurality of thumbnails in the GUI wherein each of the individual thumbnails in the first plurality of thumbnails may be a selectable hyperlink; receiving user input in the form of selecting a thumbnail; repeating the tasks of receiving, searching, selecting, and displaying until the duration of a video segment reaches a predetermined lower limit; and displaying the video segment in the GUI as viewable video.

Variation 10 may include a method as set forth in variation 9 wherein the predetermined lower limit may be about ten minutes.

Variation 11 may include a method as set forth in any of variations 9-10 wherein individual images and video segments may include a unique identifier that may include a MAC address of a camera from which the video segment or image was captured, a stream ID, an identifier establishing whether the saved object may be a video segment or an image, and a unique timestamp.

Variation 12 may include a method as set forth in any of variations 9-11 wherein searching the object store for a second plurality of images equal in number to that of the second value may further include determining that individual images in the second plurality of images cannot be found; and performing a search for approximate matches of the individual images in the second plurality of images.

Variation 13 may include a method as set forth in any of variations 9-12 wherein searching the object store for a second plurality of images equal in number to that of the second value may further include determining that individual images in the second plurality of images cannot be found; performing a search for approximate matches of the individual images in the second plurality of images; determining that individual images in the second plurality of images cannot be found; removing the last digit in the unique identifier; and performing a search for approximate matches of the individual images in the second plurality of images.

Variation 14 may include a method as set forth in any of variations 9-13 and may further include calculating and simplifying the unique identifier into a second unique identifier having fewer characters.

According to variation 15, a method may include recording a first duration of video and a first plurality of images from a camera or any other source, the first plurality of images associated chronologically with the first duration of video; storing the first duration of video in an object store while simultaneously storing the plurality of images in the object store; providing a GUI constructed and arranged to display a first plurality of thumbnails and being constructed and arranged to receive a user input of a first value for the first duration of video to be viewed and searched and user input of a second value for the first plurality of thumbnails to be displayed in the GUI; receiving the first value and the second value; searching the object store for a second plurality of images equal in number to that of the second value; selecting each of the individual images in the second plurality of images by selecting images that are chronologically and evenly distributed throughout the duration of the first duration of video; displaying each image in the second plurality of images as individual thumbnails in the first plurality of thumbnails in the GUI wherein each of the individual thumbnails in the first plurality of thumbnails may be a selectable hyperlink; receiving user input in the form of selecting a thumbnail; repeating the tasks of receiving, searching, selecting, and displaying until the duration of a video segment reaches a predetermined lower limit; and displaying the video segment in the GUI as viewable video.

Variation 16 may include a method as set forth in variation 15 wherein individual images and video segments may include a unique identifier that may include a MAC address of a camera from which the video segment or image was captured, a stream ID, an identifier establishing whether the saved object may be a video segment or an image, and a unique timestamp.

Variation 17 may include a method as set forth in any of variations 15-16 wherein searching the object store for a second plurality of images equal in number to that of the second value may further include determining that individual images in the second plurality of images cannot be found; and performing a search for approximate matches of the individual images in the second plurality of images.

Variation 18 may include a method as set forth in any of variations 15-17 wherein searching the object store for a second plurality of images equal in number to that of the second value may further include determining that individual images in the second plurality of images cannot be found; performing a search for approximate matches of the individual images in the second plurality of images; determining that individual images in the second plurality of images cannot be found; removing the last digit in the unique identifier; and performing a search for approximate matches of the individual images in the second plurality of images.

Variation 19 may include a method as set forth in any of variations 15-18 may further include calculating and simplifying the unique identifier into a second unique identifier having fewer characters.

As required, detailed variations of the present invention are disclosed herein; however, it is to be understood that the disclosed variations are merely exemplary of the invention that may be embodied in various and alternative forms. The figures are not necessarily to scale; some features may be exaggerated or minimized to show details of particular components or steps. Therefore, specific structural and functional details disclosed herein are not to be interpreted as limiting, but merely as a representative basis for teaching one skilled in the art to variously employ the present invention The above description of variations within the scope of the invention is merely demonstrative in nature and, thus, variations thereof are not to be regarded as a departure from the spirit and scope of the inventions disclosed within this document.

What is claimed is:

1. A method for searching a digital video recording, the method comprising:
    receiving a video portion count associated with the digital video recording; and
    displaying in a graphical user interface (GUI) a number of sequential digital video images from the digital video recording in response to the video portion count to obtain displayed digital video images, the number of sequential digital video images associated with a number of sequential portions of the digital video recording, the number of sequential digital video images from the digital video recording are pulled from evenly spaced, periodic intervals of the digital video recording.

2. The method of claim 1, wherein the displayed digital video images are selectable.

3. The method of claim 1, wherein the displayed digital video images are selectable thumbnails.

4. The method of claim 1, wherein the displayed digital video images are selectable hyperlinks.

5. A method for searching a digital video recording, the method comprising:
- receiving a video portion count associated with the digital video recording;
- displaying in a graphical user interface (GUI) a number of sequential digital video images from the digital video recording in response to the video portion count to obtain displayed digital video images, the number of sequential digital video images associated with a number of sequential portions of the digital video recording, the number of sequential digital video images from the digital video images from the digital video recording are pulled from evenly spaced, periodic intervals of the digital video recording;
- receiving a selection of one of the number of sequential digital video images; and
- displaying in the GUI a second number of sequential digital video images from the sequential portion of the digital video recording associated with the selection of the one of the number of sequential digital video images to obtain displayed second digital video images, the displayed second digital video images are selectable second thumbnails.

6. The method of claim 5, wherein a duration of each of the number of sequential portions of the digital video recording is equal.

7. The method of claim 5, wherein the displayed digital video images are selectable hyperlinks.

8. The method of claim 5, wherein the video portion count is independent of a duration of the digital video recording.

9. A non-transitory memory for storing machine instructions that are to be executed by a computer, the machine instructions implementing the following tasks when executed by the computer:
- receiving a video portion count associated with the digital video recording; and
- displaying in a graphical user interface (GUI) a number of sequential digital video images from the digital video recording in response to the video portion count to obtain displayed digital video images, the number of sequential digital video images associated with a number of sequential portions of the digital video recording, the number of sequential digital video images from the digital video recording are pulled from evenly spaced, periodic intervals of the digital video recording.

10. The non-transitory memory of claim 9, wherein the displayed digital video images are selectable.

11. The non-transitory memory of claim 9, wherein the machine instructions implement the following, further tasks when executed by the computer:
- receiving a selection of one of the number of sequential digital video images; and
- displaying in the GUI a second number of sequential digital video images from the sequential portion of the digital video recording associated with the selection of the one of the number of sequential digital video images.

12. The non-transitory memory of claim 9, wherein a duration of each of the number of sequential portions of the digital video recording is equal.

13. The non-transitory memory of claim 9, wherein the displayed digital video images are selectable thumbnails.

14. The non-transitory memory of claim 9, wherein the displayed digital video images are selectable hyperlinks.

15. The non-transitory memory of claim 9, wherein the video portion count is independent of a duration of the digital video recording.

16. A computer including a non-transitory memory for storing machine instructions that are to be executed by the computer, the machine instructions implementing the following tasks when executed by the computer:
- receiving a video portion count associated with the digital video recording; and
- displaying in a graphical user interface (GUI) a number of sequential digital video images from the digital video recording in response to the video portion count to obtain displayed digital video images, the number of sequential digital video images associated with a number of sequential portions of the digital video recording, the number of sequential digital video images from the digital video recording are pulled from evenly spaced, periodic intervals of the digital video recording.

17. The computer of claim 16, wherein the displayed digital video images are selectable.

18. The computer of claim 17, wherein the machine instructions implement the following, further tasks when executed by the computer:
- receiving a selection of one of the number of sequential digital video images; and
- displaying in the GUI a second number of sequential digital video images from the sequential portion of the digital video recording associated with the selection of the one of the number of sequential digital video images.

19. The computer of claim 16, wherein a duration of each of the number of sequential portions of the digital video recording is equal.

* * * * *